United States Patent [19]
Lee

[11] 3,769,550
[45] Oct. 30, 1973

[54] VOLTAGE SENSITIVE CONTROL DEVICE
[75] Inventor: Irvin I. Lee, Minneapolis, Minn.
[73] Assignee: Lear Siegler, Inc., Minneapolis, Minn.
[22] Filed: May 30, 1972
[21] Appl. No.: 257,509

[52] U.S. Cl. .......... 317/33 SC, 317/31, 317/36 TD, 323/38
[51] Int. Cl. ........................................... H02h 7/00
[58] Field of Search ................. 317/9 D, 31, 33 SC, 317/33 C, 36 TD, 141 R, 141 S; 323/34, 35, 38, 39

[56] References Cited
UNITED STATES PATENTS
| | | | |
|---|---|---|---|
| 3,243,796 | 3/1966 | Harmon et al. | 317/33 SC |
| 3,335,325 | 8/1967 | Elpers | 317/33 SC |
| 3,434,011 | 3/1969 | Zocholl | 317/36 TD |
| 3,566,198 | 2/1971 | Delahunty | 317/33 SC |
| 3,611,050 | 10/1971 | Weber | 317/31 |

FOREIGN PATENTS OR APPLICATIONS
1,360,312   3/1964   France ............................ 317/33 SC

*Primary Examiner*—Gerald Goldberg
*Attorney*—L. Paul Burd et al.

[57] ABSTRACT

A power supply monitor circuit which disconnects a load from the alternating current supply lines when the output voltage from the supply drops below a predetermined level for an interval of time exceeding a certain predetermined tolerable interval. The output voltage level of the supply is sensed by a voltage divider connected in parallel with the supply, and a Zener diode is used to establish a lower threshold at which a silicon controlled rectifier (SCR) can be fired. The SCR is connected in series with a load cut-out relay to thereby control the relay energization. A time delay circuit is associated with the gate electrode of the SCR to allow conduction thereof for a short time period following a drop in supply voltage, thus establishing the tolerable interval and permitting and accommodating momentary voltage drops.

2 Claims, 2 Drawing Figures

VOLTAGE SENSITIVE CONTROL DEVICE

BACKGROUND OF THE INVENTION

This invention relates generally to a brown-out protection circuit of the type employed to protect sensitive load elements, such as alternating current motors, from damage due to a partial loss or drop in the voltage being supplied thereto, and more specifically to such a circuit which is constructed from solid-state components and is arranged to yield fail-safe operation.

In Gilbert U.S. Pat. No. 3,389,325, there is described a system of the type herein described which is responsive to a drop in supply voltage to disconnect a motor from the supply mains. In the Gilbert circuit, the drop in supply voltage causes a Zener diode to cut off to thereby fire a uni-junction transistor, which, in turn, causes a silicon controlled rectifier to fire. This energizes a relay to cut the load out of the supply circuit. In the event of a total loss of power, however, the control relay will not be energized and cannot serve to protect the load until power is restored.

SUMMARY OF THE INVENTION

In the preferred embodiment of the present invention, as soon as the supply voltage drops below a prescribed threshold for a predetermined time interval, such as below a level of 90 percent of the nominal or rated voltage. The control relay is de-energized and the associated normally open contacts disconnect the load from the power supply. This occurring even when there is a total loss of power. This operation is accomplished by connecting the control relay in a series circuit with a SCR and in parallel with the load to be protected. The normally open contacts of the relay are disposed between the alternating current supply and the load, and remain closed only so long as the relay winding is energized. The conduction of the SCR on alternate half-cycles of the AC supply is controlled by a time delay network and a threshold setting network such that the SCR is able to be fired for only a short predetermined period following a steady or continuous drop of potential below the threshold. This arrangement permits short-termed fluctuations in the AC supply and only serves to separate the load from the supply when the drop persists for a given period.

It is accordingly the object of this invention to provide a novel, fail-safe, low cost, reliable line voltage monitoring and disconnect circuit for protecting a load from the effects of a drop in supply voltage.

This and other objects of the invention will become apparent from a reading of the accompanying detailed description, especially in light of the accompanying drawings.

DESCRIPTION OF THE FIG. 1 EMBODIMENT

Figure 1:
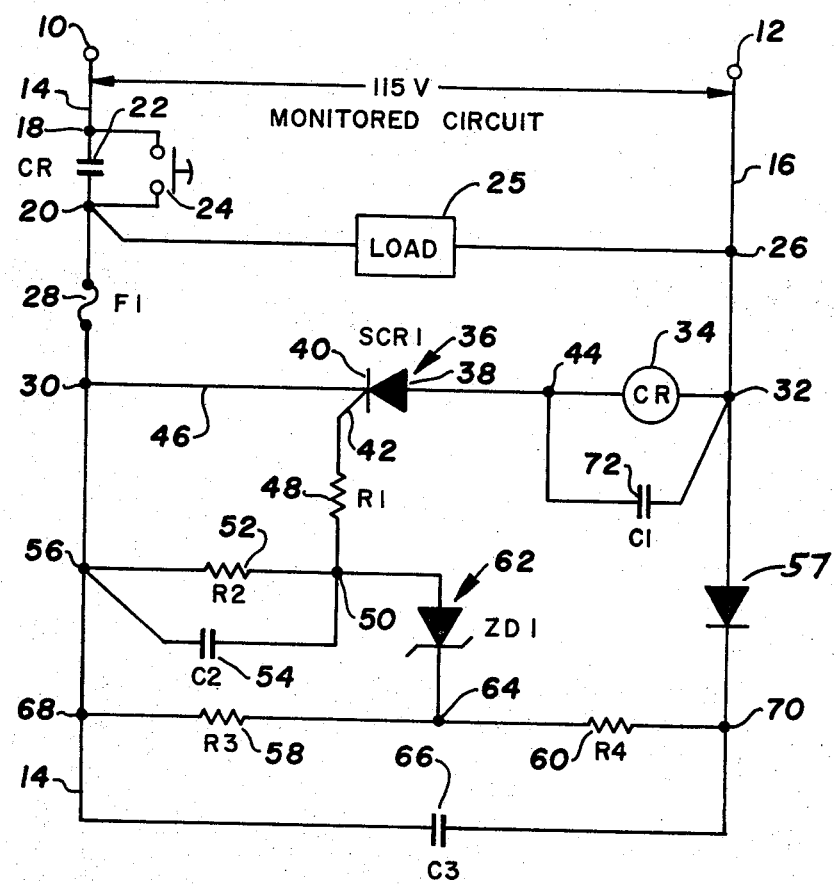
FIG. 1 illustrates one embodiment of the invention in which a manual reset is used to re-initiate operation following the resumption of full power.

Referring to FIG. 1, there is shown one embodiment of a brown-out protection circuit. The terminals 10 and 12 are adapted to be connected to a source of alternating current voltage to be monitored. A pair of lines 14 and 16 are respectively connected to the terminals 10 and 12. Connected in series between junction points 18 and 20 in line 14 is a normally open relay contact 22. Connected in parallel with contact 22 is a normally open, manually operable push-button switch 24. The load 25 to be protected is adapted to be connected between the junction point 20 and a junction 26 on line 16. Also disposed in line 14 is a fuse link 28 which is included to provide protection to the various components in the brown-out protector circuit.

Connected across the lines 14 and 16 between junction points 30 and 32 is a series circuit including a relay 34 and a silicon controlled rectifier (SCR) 36. The relay 34, when energized with sufficient current, causes the contacts 22 to be held closed. The SCR 36 has a cathode electrode 40, an anode electrode 38 and a gate electrode 42. The anode electrode 38 is connected at junction 44 to one terminal of the relay 34. The cathode electrode is connected by a conductor 46 to the junction point 30 on line 14. The gate electrode 42 is coupled through a resistor 48 to a junction point 50. Also coupled to the junction point 50 is a first terminal of a parallel combination of a resistor 52 and a capacitor 54. The other terminal of this parallel combination is identified by numeral 56 on line 14. A diode 57 is disposed in the line 16 and serves to half-wave rectify the applied alternating current input applied at terminals 10 and 12.

Connected in series across the lines 14 and 16 are a pair of resistors 58 and 60 which act and function as a voltage divider. In the embodiment of FIG. 1, resistor 58 should be in the range of, for example, from three to 10 times the ohmic value of resistor 60, with this range being suitable for a variety of purposes, and with other ranges being useful. A Zener diode 62 connects the junction point 50 to a junction 64 which is the common terminal between resistors 58 and 60. A capacitor 66 is connected across the lines 14 and 16 between the junction points 68 and 70 and is therefore in parallel circuit with the voltage divider resistors 58 and 60. This capacitor serves as a filter to smooth out the ripples in the half-wave rectified direct current developed across the voltage divider comprised of resistors 58 and 60 and to suppress transient signals which might otherwise adversely affect the operation of the circuit components. Finally, a capacitor 72 is connected in parallel with the relay winding 34 across the junction points 32 and 44.

Now that the details of the construction of the embodiment of FIG. 1 have been explained, consideration will be given to the mode of operation of the brown-out protector circuit.

OPERATION — FIG. 1

In operation, the terminals 10 and 12 are connected to a source of alternated current potential such as a 115-volt, 60-cycle supply, such that a half-wave rectified direct current potential will be developed across the resistors 58 and 60. With this connection established and with the magnitude of the voltage divider resistors 58 and 60 properly selected, when the push-button switch 24 is momentarily closed, gate current will be provided through the Zener diode 62 and the resistor 48 to the gate electrode 42 of the silicon controlled rectifier 36. Hence, for the half-cycle of the alternating current supply, when the terminal 12 is positive with respect to the terminal 10, the SCR 36 will be fired into its low impedance state and sufficient current will flow through the relay coil 34 to actuate the contacts 22 to their closed position so that the manual switch 24 can be released. At the same time, a charge will be built up on the capacitor 72 so that when the polarity of the AC supply is reversed on the subsequent half-cycle to thereby extinguish the SCR 36, the residual charge on capacitor 72 will maintain the relay 34 energized during this half-cycle so that the contacts 22 will remain closed.

The Zener diode 62 provides a threshold for the brown-out protection circuit so that it will operate to disconnect the load from the AC supply lines when the supply voltage falls below this threshold or level for an interval greater than a predetermined period of time. Specifically, by properly setting the ratio of resistor 58 to resistor 60, and by including the Zener diode 62 in series with the resistor 48 between the gate terminal 42 and the junction point 64, when the voltage across the lines 14 and 16 drops to a predetermined level, say 90 percent of its nominal or normal rated value, insufficient gate current will be supplied to the SCR 36 to allow it to be fired. Hence, the charge on capacitor 72 will decay and will not be restored on alternate half-cycles and the relay coil 34 will be de-energized. The de-energization of relay 34 will permit the contacts 22 to open and thereby disconnect the load 25 from the alternating current supply.

To insure that short term reductions in supply voltage below the desired threshold will not cause the load to be disconnected, a time delay circuit including the capacitor 54 and the resistors 48 and 52 is provided. The charge which is stored in capacitor 54 by the current which flows through the Zener diode 62 when biased to its conducting state is sufficient to maintain the flow of gate current through the SCR 36 for a predetermined number of cycles of the AC supply even though the voltage of the supply has dropped below the established threshold and the Zener diode is substantially non-conducting. It is only after the time taken by the charge of capacitor 54 to leak off or decay through the resistor 52 and 48 that the SCR 36 will be prevented from firing on its appropriate half-cycle. By proper selection of the values of resistor 52 and capacitor 54, this time delay can be made arbitrarily long.

Following a drop in supply voltage in excess of this predetermined period, it is again necessary to manually re-establish the connection of the load and the monitoring circuit to the AC supply by closing the push-button switch 24 as previously described. Provided the supply voltage is above the established threshold determined by the voltage divider resistors 58 and 60 and the Zener diode 62, sufficient gate current will flow through the Zener diode 62 to permit the SCR 36 to again be fired during its appropriate half-cycle to again establish sufficient current flow through the relay coil 34 to effect closure of the relay contacts 22.

For purposes of illustration only and with no limitation necessarily intended, there is listed below the component types and values which may be used in constructing the circuit of FIG. 1 for general use on 115-volt, 60-cycle supply systems.

| SCR | Type C106B |
|---|---|
| Resistor 48 | 100,000 ohms |
| Resistor 52 | 100,000 ohms |
| Resistor 58 | 68,000 ohms |
| Resistor 60 | 22,000 ohms |
| Capacitor 72 | 5 microfarads |
| Capacitor 54 | 10 microfarads |
| Capacitor 66 | 5 microfarads |
| Zener Diode 62 | 100 volt, 1 Watt |
| Diode 57 | Type 1N2069 |

DESCRIPTION OF THE FIG. 2 EMBODIMENT

Figure 2:
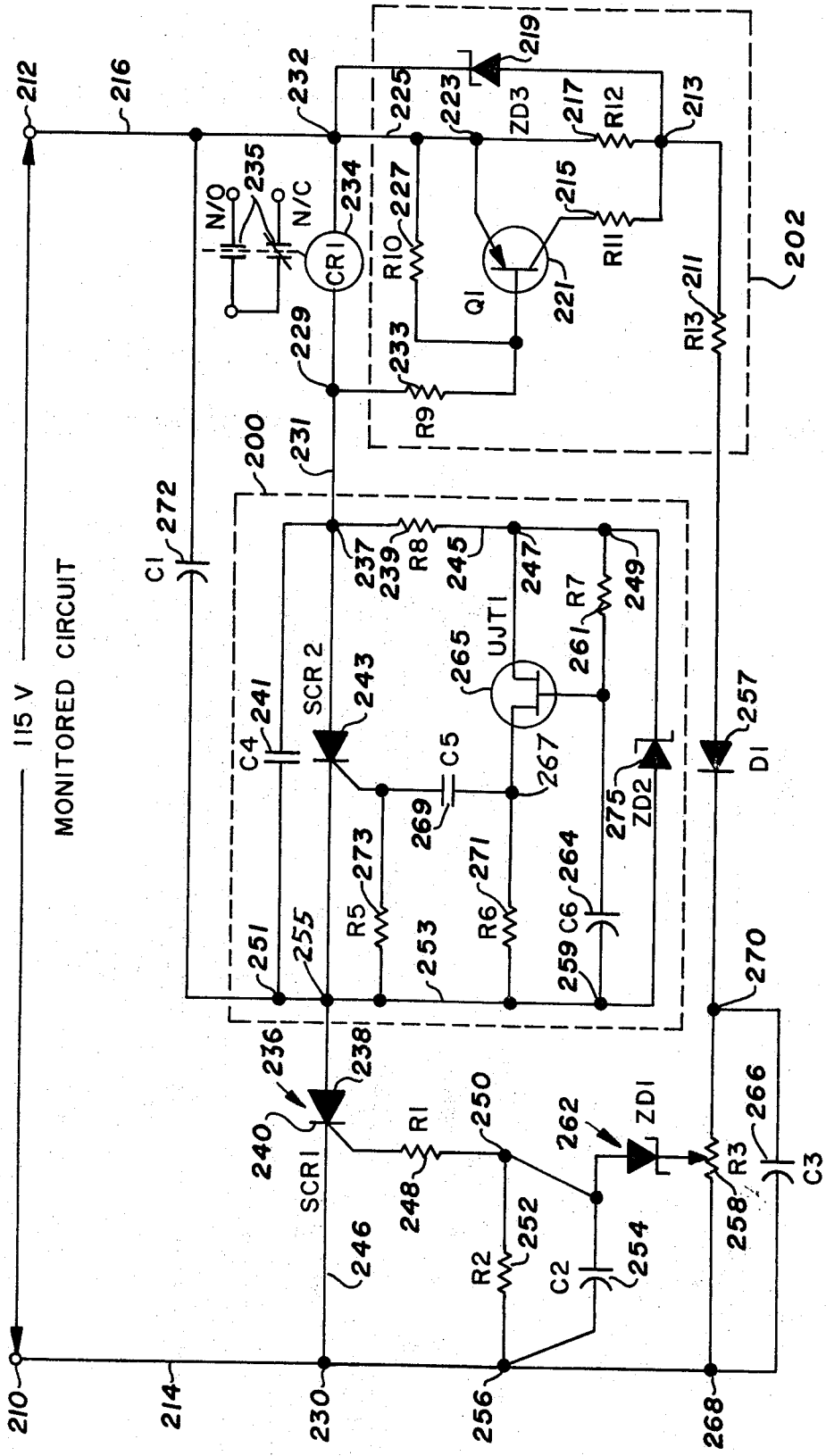
FIG. 2 illustrates a modification of the circuit of FIG. 1, incorporating means for automatically reinitiating proper operation following a loss of power.

In FIG. 2 there is illustrated another embodiment of a brown-out protection circuit which provides for the automatic re-initiation of the load circuit when full power is restored following a brown-out condition.

Referring to FIG. 2, the circuit components added to the embodiment of FIG. 1 to attain automatic reset are shown enclosed by the dashed line boxes 200 and 202. The circuit components, conductors, and junction points which are the same as those illustrated in FIG. 1, are given the same identifying numeral except that these numerals are preceded by the number 2 to clearly indicate that they are associated with the embodiment of FIG. 2.

The terminals 210 and 212 are adapted to be connected to a source of alternating current voltage to be monitored. A pair of lines 214 and 216 are respectively connected to the terminals 210 and 212. A conductor 246 connects the cathode electrode 240 of SCR 236 to a junction point 230 on conductor 214. The gate electrode of SCR 236 is connected by way of a resistor 248 to a junction point 250. The parallel combination of a second resistor 252 and a capacitor 254 is connected between the junction 250 and the junction 256 on line 214. A Zener diode 262 connects the junction point 250 to the wiper terminal of a voltage divider potentiometer 258 which is connected between a junction point 268 on conductor 214 and a junction point 270. Connected directly in parallel with the voltage divider potentiometer 258 is a capacitor 266. The cathode electrode of a conventional semiconductor diode 257 is connected to the junction point 270. The anode electrode of diode 257 is connected through a resistor 211 to a junction point 213 to which is also connected a first terminal of a pair of resistors 215 and 217 and the anode electrode of a Zener diode 219. The other terminal of resistor 215 is connected to the collector electrode of a transistor 221. The other terminal of resistor 217 is connected to a junction point 223 to which is connected the emitter electrode of the transistor 221. While the transistor 221 is illustrated as being of the PNP type, it is obvious to those skilled in the art that a NPN transistor type can be substituted provided proper polarity conventions are observed. The junction 223 is connected by a conductor 225 to the junction point 232. A resistor 227 connects the base electrode of transistor 221 to the conductor 225. The winding of a relay 234 is connected between the junction point 232 and a junction 229 on a conductor 231. A resistor 233 is connected between junction point 229 and the base electrode of the transistor 221.

Associated with the relay winding 234 is a set of double pole-double throw relay contacts 235. The load to be protected (not shown) is adapted to be connected in circuit with these contacts so as to be disconnected from its associated power supply when the voltage applied thereto drops below a predetermined threshold for a pre-established period of time. Disposed between the junction 229 on conductor 231 and the anode electrode 238 of the SCR 236 is the circuitry contained within the dashed box 200. More specifically, the conductor 231 is connected to a junction 237 which has connected thereto a first terminal of a resistor 239, a first terminal of a capacitor 241 and the anode electrode of a second silicon controlled rectifier (SCR) 243. The second terminal of the resistor 239 is connected by a conductor 245 to a pair of junction points 247 and 249. The other terminal of the capacitor 241 is connected to a junction point 251 on a conductor 253. The cathode electrode of the SCR 243 is connected to junction 255 to which is also connected the anode electrode of SCR 236.

Connected between the junction point 249 and a junction 259 on conductor 253 is a voltage divider including a resistor 261 and a capacitor 264. The junction between the resistor 261 and capacitor 264 is connected to the emitter electrode of a uni-junction transistor (UJT) 265. A first base terminal of UJT 265 is connected to the junction point 247 on conductor 245. The remaining base terminal of UJT 265 is connected to a junction point 267 to which is also connected a first terminal of a capacitor 269 and a resistor 271. The other terminal of capacitor 269 is connected to the gate electrode of SCR 243 while the other terminal of the resistor 271 is connected to a junction point on conductor 253. A resistor 273 also connects the gate electrode of SCR 243 to a junction on the conductor 253. A Zener diode 275 has its anode electrode connected to the junction point 259 on conductor 253 and its cathode electrode connected to the junction point 249 on conductor 245 and is therefore directly in parallel with the voltage divider comprised of resistor 261 and capacitor 264. Finally, the capacitor 272 is connected between a junction on conductor 216 and the junction point 251 on conductor 253.

Now that the details of the construction and layout of the embodiment of FIG. 2 have been described, consideration will be given to its mode of operation.

OPERATION — FIG. 2

Let it be initially assumed that the terminals 210 and 212 have been connected to a suitable source of alternating current which has been maintained at rated value for some period of time. Under these assumed conditions, the SCR's 236 and 243 will have gate current applied thereto and therefore will be rendered conductive to provide half-wave rectification. The relay winding 234 will accordingly be energized and the capacitor 272 will have its charge periodically replenished and acts as a filter for the half-wave rectified DC current supplied to the relay coil 234. Under the previously assumed conditions, the UJT 265 and the transistor 221 will both be conducting.

If it is now assumed that the supply voltage drops for a time exceeding a predetermined interval determined by the RC time constant established by resistor 252 and capacitor 254 such that capacitor 254 can no longer supply the requisite gate current for SCR 236, SCR 236 will be turned off, thus disconnecting capacitor 272 from the supply which is connected to the terminals 210 and 212. After the charge stored on capacitor 272 is dissipated, the relay coil 234 will be de-energized and the contacts 235 associated therewith will switch so as to disconnect the load (not shown) from the source of supply voltage. The turning off of SCR 236 also serves to disconnect the SCR 243 from the supply and it too is rendered non-conductive. Uni-junction transistor 265 and transistor 221 will also be rendered non-conductive following the turning off of SCR 236.

If it is next assumed that the brown-out condition ends and the power returns to its normal rated value, the current flowing through resistor 217, resistor 211, diode 257 and the parallel combination of resistor 258 and capacitor 266 will be half-wave rectified by the diode 257. As the voltage builds up across the voltage divider 258, the threshold established by the Zener diode 262 will be exceeded and gate current will again flow through resistor 248 and the Zener diode 262 such that SCR 236 will fire at the point in the cycle when terminal 212 is positive with respect to terminal 210.

The firing of SCR 236 serves to connect the series combination of the relay coil 234 and the capacitor 241 across the supply lines 214 and 216, with practically the entire supply voltage being dropped across the capacitor 241. This serves to suppress transient spikes initiated by the firing of SCR 236 and prevents false firing of the SCR 243. The voltage on capacitor 241 is divided by the voltage divider comprised of resistor 239 and the Zener diode 275. This combination of resistor and Zener diode fix the voltage across the series circuit including resistor 261 and capacitor 264 at the nominal value of the Zener diode. These last mentioned components comprise a time delay circuit in that as the charge builds up on capacitor 264 by way of resistor 261, a point is reached at which the UJT 265 will be rendered conductive. Once UJT 265 is conducting, capacitor 264 discharges and a positive pulse is coupled through the capacitor 269 to the gate electrode of SCR 243 causing it to fire.

With both SCR 236 and SCR 243 conducting, the relay winding 234 will be energized with sufficient current to cause its associated contacts to reverse their position. The firing of the SCR 243 also alters the bias applied to the transistor 221 by way of resistor 233 and transistor 221 is rendered fully conducting. Because resistor 215 is small in comparison to resistor 217, the effect of turning on transistor 221 is to shunt out the resistor 217 such that an increased voltage is developed across the capacitor 266. This action provides a predetermined differential between the firing level and extinction level of the SCR 236. Thus it will only be when the power again drops below a pre-set threshold that the SCR 236 will be rendered non-conductive to again disconnect the load from the source.

The timing of the firing of the uni-junction transistor 265 by the resistor 261 and capacitor 264 time delay circuit insures that the alternating current supply is up to its maximum level before the load is connected to the supply by the energization of the relay winding 234.

The function of the Zener diode 219 is to limit the voltage developed across resistor 217 and therefore prevents the charge on capacitor 266 from exceeding the voltage rating of the transistor 221 which might otherwise burn it out. The resistor 211 acts as a current limiter for the Zener diode 219.

Thus it can be seen that the circuit of FIG. 2 is effective to automatically reset following the restoration of full power to the system for a length of time exceeding a predetermined value. This is to be distinguished from the operation of the circuit of FIG. 1 which required that a manually operated push-button be depressed following the restoration of full power in order to cause the relay 34 to be energized.

Again, for purposes of illustration only and with no limitation necessarily intended, there is listed below the component types and values which may be used in constructing the circuit of FIG. 2 for general use on 115-volt, 60-cycle supply systems.

| | |
|---|---|
| Zener diode 262 | 100 volt/1 Watt |
| Zener diode 275, 219 | 24 volt/1 Watt |
| Diode 257 | Type 1N2069 |
| UJT 265 | Type 2N2646 |
| Transistor 221 | Type 2N1303 |
| SCR 243, 236 | Type C106B |
| Relay 234 | DPDT Relay 120 V. D.C. |
| Resistors 248, 252 | 100 kilohms |
| Potentiometer 258 | 100 kilohms-variable |
| Resistor 273 | 10 ohms |
| Resistor 271 | 100 ohms |
| Resistor 261 | 2.7 megohms |
| Resistor 239 | 33 kilohms |
| Resistor 233 | 36 kilohms |
| Resistor 227 | 330 ohms |
| Resistor 215 | 100 ohms |
| Resistor 217 | 1000 ohms |
| Resistor 211 | 47 ohms |
| Capacitors 272, 266 | 5 microfarad/250 V. |
| Capacitors 254, 264 | 10 microfarad/50 V. |
| Capacitors 241, 269 | 0.1 microfarad/200 V. |

Thus, it can be seen that this invention is effective to provide protection to a load circuit of the type which might otherwise be damaged by an insufficient supply voltage.

I claim:

1. A power supply monitoring circuit for disconnecting a load device from a power supply in the event of a sustained drop in supply voltage, said circuit including:
   a. first and second lines adapted to be connected to a source of alternating current;
   b. a relay having a coil and a set of normally open contacts associated therewith;
   c. a first triggerable switching means having a pair of output electrodes and a control electrode;
   d. a second triggerable switching means having a pair of output electrodes and a control electrode;
   e. means connecting said relay coil and the output electrodes of said first and second triggerable switching means in series between said first and second lines;
   f. a resistive voltage divider connected in parallel with the series combination of said first and second triggerable switching means and said relay coil;
   g. means including a voltage threshold establishing device connecting said voltage divider to the control electrode of said first triggerable switching means, such that said relay coil is maintained energized and said contacts are maintained closed so long as the voltage applied to said first control electrode exceeds said threshold;
   h. delay means connected to said first control electrode for maintaining a triggering signal thereon for at least a first predetermined time period following said drop in supply voltage, said delay means connected to said first control electrode including a resistor and a capacitor connected in parallel with each other and in series with said voltage threshold establishing device;
   i. timing means associated with the electrode of said second triggerable switching means, said timing means being operative upon triggering of said first triggerable switching means to apply triggering signals to said second control electrode a predetermined time following the triggering of said first triggerable switching means.

2. A power supply monitoring circuit for disconnecting a load device from a power supply in the event of a sustained drop in supply voltage, said circuit including:
   a. first and second lines adapted to be connected to a source of alternating current;
   b. a relay having a coil and a set of normally open contacts associated therewith;
   c. a first triggerable switching means having pair of output electrodes and a control electrode;
   d. a second triggerable switching means having a pair of output electrodes and a control electrode;
   e. means connecting said relay coil and the output electrodes of said first and second triggerable switching means in series between said first and second lines;
   f. a resistive voltage divider connected in parallel with the series combination of said first and second triggerable switching means and said relay coil;
   g. means including a voltage threshold establishing device connecting said voltage divider to the control electrode of said first triggerable switching means, such that said relay coil is maintained energized and said contacts are maintained closed so long as the voltage applied to said first control electrode exceeds said threshold;
   h. delay means connected to said first control electrode for maintaining a triggering signal thereon for at least a first predetermined time period following said drop in supply voltage, said delay means connected to said first control electrode including a resistor and a capacitor connected in parallel with each other and in series with said voltage threshold establishing device;
   i. timing means associated with the control electrode of said second triggerable switching means, said timing means being operative upon triggering of said first triggerable switching means to apply triggering signals to said second control electrode a predetermined time following the triggering of said first triggerable switching means;
   j. said timing means including:
      1. a resistor and a capacitor connected in series between one of said output terminals of said first triggerable switching means and said relay coil, and
      2. a uni-junction transistor having a pair of output electrodes and a control electrode, the control electrode of said uni-junction transistor being connected to the common point between said resistor and capacitor, and the pair of output electrodes of said uni-junction said transistor being coupled to the control electrode of said second triggerable switching means.

* * * * *